(12) United States Patent
Xu et al.

(10) Patent No.: US 12,199,473 B2
(45) Date of Patent: Jan. 14, 2025

(54) ROTOR, MOTOR, COMPRESSOR, AND REFRIGERATION APPARATUS

(71) Applicant: ANHUI MEIZHI PRECISION MANUFACTURING CO., LTD., Anhui (CN)

(72) Inventors: Fei Xu, Anhui (CN); Xiaohua Qiu, Anhui (CN); Bo Jiang, Anhui (CN)

(73) Assignee: ANHUI MEIZHI PRECISION MANUFACTURING CO., LTD., Anhui (CN)

( * ) Notice: Subject to any disclaimer, the term of this patent is extended or adjusted under 35 U.S.C. 154(b) by 532 days.

(21) Appl. No.: 17/525,650

(22) Filed: Nov. 12, 2021

(65) Prior Publication Data

US 2022/0077735 A1 Mar. 10, 2022

Related U.S. Application Data

(63) Continuation of application No. PCT/CN2019/109874, filed on Oct. 8, 2019.

(30) Foreign Application Priority Data

Aug. 26, 2019 (CN) .......................... 201910792059.1

(51) Int. Cl.
*H02K 1/276* (2022.01)
*F25B 31/02* (2006.01)
*H02K 21/16* (2006.01)

(52) U.S. Cl.
CPC .......... *H02K 1/2766* (2013.01); *H02K 21/16* (2013.01); *F25B 31/023* (2013.01); *H02K 2213/03* (2013.01)

(58) Field of Classification Search
CPC .. H02K 1/2766; H02K 21/16; H02K 2213/03; H02K 7/14; H02K 1/276;

(Continued)

(56) References Cited

U.S. PATENT DOCUMENTS 6,087,752 A 7/2000 Kim et al.
2008/0018190 A1 1/2008 Takahata et al.
(Continued)

FOREIGN PATENT DOCUMENTS

CN 101110528 A 1/2008
CN 101529698 A 9/2009
(Continued)

OTHER PUBLICATIONS

English translation of JP-2018-182999-A (Year: 2018).*

(Continued)

*Primary Examiner* — Tulsidas C Patel
*Assistant Examiner* — Joshua Kiel M Rodriguez
(74) *Attorney, Agent, or Firm* — Scully, Scott, Murphy & Presser, P.C.

(57) ABSTRACT

A rotor, a motor, a compressor and a refrigeration apparatus are provided. The rotor has a rotor core, permanent magnets and multiple slits. The rotor core has multiple installation recesses. The permanent magnets are provided in the installation recesses to form magnetic poles. The multiple slits are arranged at the rotor core and positioned at respective sides of the installation recesses away from a rotation axis of the rotor. A connection line between central points of two end portions of the slit close to and away from the installation recess forms a direction line of the slit within a cross-section perpendicular to the rotation axis of the rotor. A central line of any magnetic pole passing through a central axis of the rotor core is defined as an axis d.

20 Claims, 8 Drawing Sheets

(58) Field of Classification Search
CPC ........ H02K 1/14; H02K 1/165; F25B 31/023; Y02T 10/64
See application file for complete search history.

(56) References Cited

U.S. PATENT DOCUMENTS

| | | | |
|---|---|---|---|
| 2008/0224558 A1 | 9/2008 | Ionel et al. | |
| 2010/0156234 A1 | 6/2010 | Hoemann et al. | |
| 2016/0036274 A1 | 2/2016 | Cao et al. | |
| 2017/0117762 A1 | 4/2017 | Takahata et al. | |
| 2019/0074738 A1* | 3/2019 | Yabe | H02K 15/03 |

FOREIGN PATENT DOCUMENTS

| | | |
|---|---|---|
| CN | 102142722 A | 8/2011 |
| CN | 102403862 A | 4/2012 |
| CN | 103891102 A | 6/2014 |
| CN | 103999331 A | 8/2014 |
| CN | 104269986 A | 1/2015 |
| CN | 105958689 A | 9/2016 |
| CN | 106464048 A | 2/2017 |
| CN | 107819365 A | 3/2018 |
| CN | 109155550 A | 1/2019 |
| JP | H10178751 A | 6/1998 |
| JP | 2001025194 A | 1/2001 |
| JP | 2001037186 A | 2/2001 |
| JP | 2010200387 A | 9/2010 |
| JP | 2011078283 A | 4/2011 |
| JP | 2011120333 A | 6/2011 |
| JP | 2012254019 A | 12/2012 |
| JP | 5208084 B2 | 6/2013 |
| JP | 2013118748 A | 6/2013 |
| JP | 2013132164 A | 7/2013 |
| JP | 2013132172 A | 7/2013 |
| JP | 2015208053 A | 11/2015 |
| JP | 2017050965 A | 3/2017 |
| JP | 2017108626 A | 6/2017 |
| JP | 2018-182999 A | 11/2018 |
| WO | 2008105049 A1 | 9/2008 |
| WO | 2014/090050 A1 | 6/2014 |
| WO | 2017203618 A1 | 11/2017 |
| WO | 2019041915 A1 | 3/2019 |

OTHER PUBLICATIONS

English translation of JP-2017-050965-A (Year: 2017).*
English translation of JP-5208084-B2 (Year: 2013).*
English translation of WO-2014/090050-A1 (Year: 2014).*
English translation of WO-2019-041915-A1 (Year: 2019).*
English translation of JPH10-178751-A (Year: 1998).*
First Office Action dated Jun. 29, 2021 issued in Chinese Application No. 201910792059.1.
Notification of The Second Office Action dated Sep. 7, 2021 issued in Chinese Application No. 201910792059.1.
International Search Report dated Apr. 26, 2020 issued in PCT/CN2019/109874.
First Office Action dated Jul. 1, 2023 received in Chinese Patent Application No. CN 202210181345.6.
First Office Action dated Jul. 1, 2023 received in Chinese Patent Application No. CN 202210182135.9.
Notice of Reasons for Refusal dated Oct. 25, 2022 received in Japanese Patent Application No. JP 2021-564825.
Decision of Refusal dated Feb. 7, 2023 received in Japanese Patent Application No. JP 2021-564825.
Notification of the First Office Action dated Apr. 29, 2023 received in Chinese Patent Application No. CN 202210182635.2.
Extended European Search report dated Apr. 20, 2022 received in European Patent Application No. EP 19943336.8.
Office Action dated May 3, 2024 received in European Patent Application No. EP 19943336.8.

* cited by examiner

ROTOR, MOTOR, COMPRESSOR, AND REFRIGERATION APPARATUS

CROSS-REFERENCE TO RELATED APPLICATIONS

The present application is a continuation application of PCT International Application No. PCT/CN2019/109874, filed on Oct. 8, 2019, which claims priority to and benefits of Chinese Patent Application No. 201910792059.1 filed with China National Intellectual Property Administration on Aug. 26, 2019 and entitled "Rotor, Motor, Compressor, and Refrigeration Apparatus", the entire contents of which are incorporated herein by reference for all purposes. No new matter has been introduced.

FIELD

The present disclosure relates to the technical field of compressors, in particular to a rotor, a motor, a compressor, and a refrigeration apparatus.

BACKGROUND

At present, a built-in permanent magnet motor is commonly used for a motor in a rotary direct-current variable-frequency compressor, and for the motor, the action of stator armature reaction is stronger, so that the rotor structure of the motor has a great armature iron loss. In order to provide a motor with high cost performance, the industry tends to design motors with higher power density in recent years, so the loss of the iron loss of the motor has attracted much attention. The no-load iron loss is mainly generated by the permanent magnet magnetic field, and a more targeted design can be carried out by optimizing the air gap magnetic field harmonics. But after the motor is electrified, the generated armature iron loss comes from the time and space harmonics of a composite magnetic field generated by the action of the stator magnetic field and the rotor magnetic field. Therefore, greater iron loss and vibration noise can be generated, and the part of the loss is difficult to be reduced through a targeted design. So, the suppression of the iron loss generated by the part of the current is the key to the success or failure of the design.

SUMMARY

The present disclosure aims at solving at least one of the technical problems existing in the prior art or the related art.

To this end, the first aspect of the present disclosure provides a rotor.

A second aspect of the present disclosure also provides a motor.

A third aspect of the present disclosure also provides a compressor.

A fourth aspect of the present disclosure also provides a refrigeration apparatus.

According to the first aspect of the present disclosure, a rotor is proposed. The rotor is used for a motor, the motor comprises a stator, the stator comprises a stator core and tooth portions arranged along the circumferential direction of the stator core, and the rotor is arranged in the stator. The rotor comprises a rotor core arranged with multiple installation recesses, the multiple installation recesses being distributed along the circumferential direction of the rotor core; a permanent magnet arranged in the installation recess to form a magnetic pole, wherein the permanent magnet comprises a first permanent magnet and a second permanent magnet, and extension lines of a side wall of the first permanent magnet away from the rotation axis of the rotor and a side wall of the second permanent magnet away from the rotation axis of the rotor do not coincide and intersect at one point; and multiple slits arranged on the rotor core and positioned on one side of the installation recess away from the rotation axis of the rotor, a connection line between central points of two end portions of the slit close to and away from the installation recess forming a direction line of the slit within a cross-section perpendicular to the rotation axis of the rotor, wherein the slit comprises a first slit and a second slit which are positioned on same side of axis d, and extension lines of the direction lines of the first slit and the second slit intersect at an intersection point not on the axis d, on one side of any one of the installation recesses away from the rotation axis of the rotor, and on the same side of the axis d, an included angle between the direction line of the first slit and a side wall of the installation recess towards the axis d direction is α1, and an included angle between the direction line of the second slit and the side wall of the installation recess towards the axis d direction is α2, the sum of the α1 and the α2 is greater than 180°, in a cross-section perpendicular to the rotation axis of the rotor, the extension lines of the two side walls of the tooth portion are configured to be suitable for separating the first slit and the second slit which are positioned on the same side of the axis d, and on one side of any one of the installation recesses away from the rotation axis of the rotor, a region constituted by the extension lines of the two side walls of the tooth portion is configured to be suitable for having two complete slits, a central line of any one of the magnetic poles passing through a central axis of the rotor core is set as the axis d.

The rotor provided by the present disclosure includes a rotor core and multiple slits arranged on the rotor core, the rotor core being arranged with multiple installation recesses. The installation recesses are used for installing a permanent magnet to form a magnetic pole, and the magnetic poles formed by permanent magnets in adjacent installation recesses are opposite. On the rotor core, the slit is positioned on one side of the installation recess away from the rotation axis of the rotor. A connection line between central points of two end portions of the slit close to and away from the installation recess forms a direction line of the slit within a cross-section perpendicular to the rotation axis of the rotor, wherein the central line of any magnetic pole passing through the central axis of the rotor core is set as axis d. The slits on one side of any installation recess away from the rotation axis of the rotor are symmetrically arranged along axis d, so that the counter-electromotive force waveform of the motor is ensured to be approximately a sine wave, counter-electromotive force waveform distortion is reduced, and the addition of the additional loss is reduced. The slits on the same side of the axis d include a first slit and a second slit, and extension lines of the direction lines of the first slit and the second slit intersect at an intersection point not on axis d so that by optimizing the setting direction of the slits, the air gap flux density harmonics of the rotor is reduced, the fluctuation of torque of a motor is reduced, the vibration noise is improved, and a counter-electromotive force of the rotor is increased, thereby effectively reducing the armature iron loss and enhancing low and medium frequency energy efficiency of a compressor.

Further, the included angles between the direction lines of the first slit and the second slit and the side wall of the installation recess facing the axis d direction are α1 and α2 respectively, and the sum of α1 and α2 is greater than 180°.

Namely, any one of the included angles of α1 and α2 is an obtuse angle so that the air gap magnetic field waveform is facilitated, and the armature iron loss is effectively reduced.

The rotor is used for a motor, the motor comprises a stator, the stator comprises a stator core and tooth portions arranged along the circumferential direction of the stator core, and the rotor is arranged in the stator. In a cross-section perpendicular to the rotation axis of the rotor, the extension lines of the two side walls of the tooth portion are configured to be suitable for separating the first slit and the second slit on the same side of the axis d, thereby effectively reducing armature iron loss, improving magnetic flux and further improving motor efficiency.

Further, the region W constituted by extension lines of the two side walls of the stator tooth portion is configured therein to be suitable for having two complete slits, namely a single magnetic pole has two slits with complete contours so that the air gap flux density harmonics of the motor are optimized, and the armature iron loss is effectively reduced.

In addition, the number of the slit affects the suppression effect on the armature magnetic field of the stator. Generally, the greater the number of the slits is, the better the suppression effect on the armature magnetic field of the stator is. However, if the number is too large, the counter-electromotive force is reduced, and the manufacturing difficulty is increased. So the number of slits is set to be 4 or 6 so that the problems that the structural strength of the rotor core is reduced, the magnetic flux is reduced, and the tooth space torque is increased because the number of slits is too large in the related art are avoided, and the problem that the radial force of the motor cannot be effectively improved because the number of slits is small is avoided. By arranging the number of the slits in a reasonable range, good noise reduction effect and counter-electromotive force effect of the motor can be effectively ensured under the condition of ensuring the reliability and convenience of processing of the rotor core so that the cost performance of the motor is improved.

For example, the magnetic properties, sizes, and materials of the first permanent magnet and the second permanent magnet are the same.

According to the rotor provided by the present disclosure, the rotor can also have the following additional technical features.

According to any embodiment, on one side of any one of the installation recesses away from the rotation axis of the rotor, and on the same side of the axis d, the included angle between the direction line of the first slit and the direction line of the second slit is greater than or equal to 3° and less than or equal to 20°.

According to the embodiment, the extension lines of the direction lines of the first slit and the second slit form an acute angle δ. For example, 3°≤δ≤20°, so that the overall shape of the magnetic flux is changed, the output power of the motor is effectively increased, and when the motor is applied to a compressor, low noise, i.e., high efficiency of the compressor is achieved.

According to any one of the embodiments, the sub-installation recess comprises a main groove portion and a gap portion communicated with the main groove portion, the gap portion being arranged at one end of the main groove portion close to a peripheral wall of the rotor core, wherein the length of the first permanent magnet from one end close to the second permanent magnet to one end away from the second permanent magnet is L3, and a length of the main groove portion along a length direction of the first permanent magnet is L4, wherein L3 is greater than L4.

According to the embodiment, the main groove portion is connected with the gap portion, the gap portion is used for magnetic isolation and defines that the length L3 of the first permanent magnet from one end close to the second permanent magnet to one end far away from the second permanent magnet is greater than the length L4 of the main groove portion along the length direction of the first permanent magnet, and further, the ratio (L3−L4)/L3 is between 0 and 0.5, therefore, the energy efficiency of the compressor can be improved, and the noise condition can be reduced.

According to any one of the embodiments, the minimum value of a distance between a wall face of the gap portion and the peripheral wall of the rotor core is greater than the minimum value of the distance between a wall face of the slit and a wall face of the installation recess.

According to the embodiment, the minimum value of the distance L5 between the wall face of the gap portion and the peripheral wall of the rotor core is greater than the minimum value of the distance L6 between the wall face of the slit and the wall face of the installation recess so that the magnetic flux guiding effect of the slit is improved, and the excitation application of the rotor permanent magnet is ensured while the air gap flux density harmonics of the rotor are reduced.

In any one of the embodiments, the ratio of α2 to α1 is greater than 1 and less than or equal to 1.1.

According to the embodiment, the first slit is arranged close to the axis d, and the second slit is arranged away from the axis d. By defining that the ratio of α2 to α1 is greater than 1 and less than or equal to 1.1, an acute angle is formed between the extension lines of the direction lines of the first slit and the second slit which intersect at an intersection point not on the axis d, so that the air gap flux density harmonics of the rotor are reduced, fluctuation of torque of a motor is reduced, and vibration noise is improved.

According to any one of the embodiments, α1 is greater than 90° and less than or equal to 120°; and/or α2 is greater than 90° and less than or equal to 130°.

According to the embodiment, defining the setting angle of the slit within a reasonable range can improve the air gap magnetic field waveform, effectively reduce the armature iron loss, increase the counter-electromotive force, and improve the low frequency energy efficiency of the compressor. For example, α1 is greater than 90° and less than or equal to 120°, and α2 is greater than 90° and less than or equal to 130°.

According to any one of the embodiments, the width of the first slit is L1 in a direction perpendicular to the direction line of the first slit; in a direction perpendicular to the direction line of the second slit, the width of the second slit is L2, and L1 is not equal to L2; and/or the width of any one of the slits is different along the direction line of the slit.

According to the embodiment, considering that the penetration depths of the armature magnetic field on the surface of the rotor are different, the width of the first slit and the width of the second slit in the circumferential direction are set to be different so that the variation of the width of the slit is realized, and the weakening of the armature magnetic field is facilitated.

According to any one of the embodiments, the permanent magnet includes a first permanent magnet and a second permanent magnet, the installation recess includes two sub-installation recesses, the two sub-installation recesses are arranged along the circumferential direction of the rotor core, and the first permanent magnet and the second permanent magnet are respectively arranged in the two sub-installation recesses to form magnetic poles, wherein there is a first included angle between the two sub-installation recesses in any installation recess.

According to the embodiment, the permanent magnet includes a first permanent magnet and a second permanent magnet, the magnetic field strengths of the first permanent magnet and the second permanent magnet can be the same or different, and the first permanent magnet and the second permanent magnet are respectively arranged in two different sub-installation recesses. In any installation recess, a first included angle is formed between two sub-installation recesses, that is, the first permanent magnet and the second permanent magnet are not parallel so that the waveform of the synthesized air gap magnetic field can be improved, the vibration noise of the motor is reduced, and the medium-low frequency energy efficiency of the compressor is improved.

In any one of the embodiments, the first included angle is greater than or equal to 110° and less than or equal to 150°.

According to the embodiment, the included angle between the first permanent magnet and the second permanent magnet is set to be between 110° and 150° so that the counter-electromotive force of the permanent magnet can be maximized, the low frequency energy efficiency of the compressor is further ensured, and the APF (Annual Performance Factor) is improved.

According to any one of the embodiments, in any one of the installation recesses, the two sub-installation recesses are communicated to each other, and a connection point of the two sub-installation recesses is provided with a detent convex point that protrudes into the installation recess.

According to the embodiment, a detent convex point between the connection points of the two sub-installation recesses defines the position of the permanent magnet so that the load flux density of the motor is improved, the air gap flux density waveform of the motor is optimized, the radial force of the motor is improved, and the noise of the motor is reduced.

According to any one of the embodiments, in any installation recess, the two sub-installation recesses are connected by a connecting rib.

According to the embodiment, a connecting rib is arranged between the two sub-installation recesses.

According to any one of the embodiments, the rotor core is on a cross-section perpendicular to the rotation axis of the rotor, and the slit has a contour including a straight line and/or a curved line; and/or multiple slits are symmetrically arranged relative to the axis d.

According to the embodiment, the contour of the slit can be constituted by a straight line and/or a curved line, the contour of each slit can both be an independent straight line or curved line, and a combination of the straight line and the curved line so that the layout is rationalized. In addition, multiple slits are symmetrically arranged relative to the axis d, so that the counter-electromotive force waveform of the motor is ensured to be approximate to a sine wave, the distortion of the counter-electromotive force waveform is reduced, and the addition of additional loss is reduced.

According to any one of the embodiments, the peripheral wall of the rotor core is cylindrical; and/or the rotor core includes: multiple punching sheets stacked along the rotation axis direction of the rotor, wherein a riveting and fastening portion is arranged between adjacent installation recesses, and the multiple punching sheets are connected through the riveting and fastening portions.

According to the embodiment, a rotor core is constituted by stacking multiple punching sheets, and riveting and fastening portions are arranged between adjacent installation recesses for fixing magnets so that the reliability of the rotor core is ensured.

According to a second aspect of the present disclosure, there is also provided a motor comprising: the rotor proposed by any one of the embodiments.

The motor provided by the second aspect of the present disclosure has all the beneficial effects of the rotor because the motor comprises the rotor proposed by any one of the embodiments.

According to the above embodiment, the motor further includes: a stator including a stator core, wherein the stator core is enclosed outside the rotor; multiple tooth portions arranged on one side, facing the rotor core, of the stator core, wherein the multiple tooth portions are arranged along the circumferential direction of the stator core, and a stator recess gap is defined between adjacent tooth portions; a coil wound around the tooth portion, wherein the number of the stator recess gap is Z, the number of pole pairs of the rotor is P, and the ratio of Z to 2P is equal to 3/2 or 6/5 or 6/7.

According to the embodiment, the stator includes a stator core and tooth portion, a stator recess gap is defined between adjacent tooth portions, a coil is wound around the tooth portion, and the stator core is enclosed outside the rotor. The proportional relation between the number Z of the stator recess gap and the number of pole pairs P of the rotor is defined, thereby defining a pole and recess fit of the motor. When the number of pole pairs of the rotor is P, the pole number of the rotor is 2P, namely, the motor can be a 6-pole 9-recess motor, a 4-pole 6-recess motor, an 8-pole 12-recess motor, and a 10-pole 12-recess motor. The motors of the above types can effectively reduce armature iron loss, improve magnetic flux and further improve motor efficiency.

According to any one of the embodiments, the inner diameter of the stator core is Di, the rated torque of the motor is T, the unit volume torque of the rotor is TPV, and the following relational expression is satisfied: $5.18 \times 10^{-7} \leq T \times Di^{-3} \times TPV^{-1} \leq 1.17 \times 10^{-6}$, $5 \text{ kN} \cdot \text{m} \cdot \text{m}^{-3} \leq TPV \leq 45 \text{ kN} \cdot \text{m} \cdot \text{m}^{-3}$, wherein the unit of the rated torque T of the motor is N·m, the unit of the inner diameter Di of the stator core is mm, and the unit of the unit volume torque TPV of the rotor is $\text{kN} \cdot \text{m} \cdot \text{m}^{-3}$.

In the embodiment, the rated torque of the motor is T, the inner diameter of the stator core is Di, the unit volume torque of the rotor is TPV, and $5.18 \times 10^{-7} \leq T \times Di^{-3} \times TPV^{-1} \leq 1.17 \times 10^{-6}$ is satisfied. The value range of the unit volume torque TPV is $5 \text{ kN} \cdot \text{m} \cdot \text{m}^{-3} \leq TPV \leq 45 \text{ kN} \cdot \text{m} \cdot \text{m}^{-3}$. The value range of the combined variable of the rated torque T of the motor, the inner diameter Di of the stator core, and the unit volume torque TPV of the rotor is defined so that the motor can meet the power requirement of the compressor. In addition, for the motor and the compressor adopting the rotor, the magnetic leakage of the rotor can be effectively reduced, the utilization rate of the permanent magnet is increased, and the motor efficiency is improved.

According to any one of the embodiments, one side of multiple tooth portions facing the rotor core encloses the inner side wall of the stator, and a ratio of the diameter of the inner side wall of the stator to the diameter of the outer side wall of the stator core is greater than 0.5 and less than or equal to 0.57.

According to the embodiment, the ratio of the diameter of the inner side wall of the stator to the diameter of the outer side wall of the stator core is greater than 0.5 and less than or equal to 0.57 so that the motor has a high cost performance.

According to the third aspect of the present disclosure, there is also provided a compressor comprising: the rotor as set forth in any one of the above embodiments of the first aspect; or the motor as set forth in any one of the above embodiments of the second aspect.

The compressor provided in the third aspect of the present disclosure comprises the rotor as set forth in any one of the above embodiments of the first aspect; or the motor as set forth in any one of the above embodiments of the second aspect, thereby having all the beneficial effects of the rotor or the motor.

According to the fourth aspect of the present disclosure, there is also provided a refrigeration apparatus comprising: the rotor as set forth in any one of the above embodiments of the first aspect; or the motor as set forth in any one of the above embodiments of the second aspect; or the compressor as set forth in any one of the above embodiments of the third aspect.

The refrigeration apparatus provided in the fourth aspect of the present disclosure comprises the rotor as set forth in any one of the above embodiments of the first aspect; or the motor as set forth in any one of the above embodiments of the second aspect; or the compressor as set forth in any one of the above embodiments of the third aspect, thereby having all the beneficial effects of the rotor or the motor or the compressor.

Additional aspects and advantages of the present disclosure will be apparent from the following description, or may be learned by practice of the present disclosure.

BRIEF DESCRIPTION OF THE DRAWINGS

The above and/or additional aspects and advantages of the present disclosure will become obvious and easy to understand from the description of the embodiments in conjunction with the following drawings, wherein.

The correspondence between the reference numerals and the component names in FIGS. 1-15 is:

100 a compressor, 1 a rotor, 2 a stator, 10 a rotor core, 12 an installation recess, 14 a first slit, 16 a second slit, 122 a detent convex point, 124 a connecting rib, 3 a crankshaft, 4 a main bearing, 5 a cylinder, 6 a piston, and 7 an auxiliary bearing.

DETAILED DESCRIPTION OF EMBODIMENTS

In order that the above objects, features, and advantages of the present disclosure may be more clearly understood, the present disclosure will be described in further detail with reference to the accompanying drawings and preferred embodiments. It should be noted that the embodiments and features in the embodiments of the present disclosure may be combined with one another without conflict.

In the following description, many specific details are set forth in order to fully understand the present disclosure. However, the present disclosure can also be implemented in other ways different from those described herein. Therefore, the scope of the present disclosure is not limited by specific embodiments disclosed below.

A rotor 1, a motor, a compressor 100, and a refrigeration apparatus according to some embodiments of the present disclosure are described below with reference to FIGS. 1-15.

Embodiment 1

Figure 1:
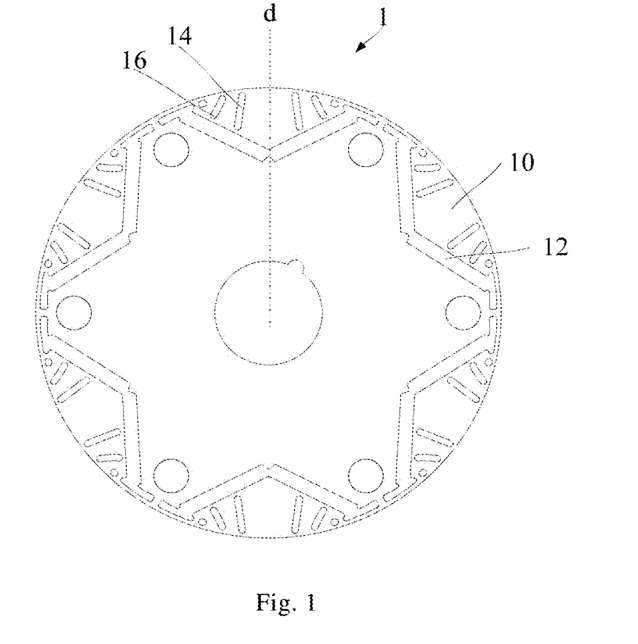
FIG. 1 is a schematic view showing the structure of a rotor according to one embodiment of the present disclosure.

As shown in FIG. 1, according to one embodiment of the first aspect of the present disclosure, the present disclosure proposes a rotor 1 comprising a rotor core 10, an installation recess 12, and multiple slits.

The rotor 1 includes: a rotor core 10 having multiple installation recesses 12 arranged in a circumferential direction of the rotor core 10; permanent magnets provided in the installation recesses 12 to form magnetic poles, wherein the permanent magnet includes a first permanent magnet and a second permanent magnet, and a side wall of the first permanent magnet away from the rotation axis of the rotor 1 and the extension line of a side wall of the second permanent magnet away from the rotation axis of the rotor 1 do not coincide and intersect at one point; multiple slits arranged at the rotor core 10 and positioned at respective sides of the installation recesses 12 away from a rotation axis of the rotor 1, a connection line between central points of two end portions of the slit close to and away from the installation recess 12 forming a direction line of the slit within a cross-section perpendicular to the rotation axis of the rotor 1, wherein the slits include a first slit 14 and a second slit 16 positioned on same side of axis d, extension lines of the direction lines of the first slit 14 and the second slit 16 intersect at an intersection point not on axis d, and a central line of any magnetic pole passing through a central axis of the rotor core 10 is set as axis d.

The present disclosure provides a rotor 1 which comprises a rotor core 10 and multiple slits arranged on the rotor core 10, wherein the rotor core 10 is provided with multiple installation recesses 12, in particular, the installation recesses 12 are used for installing permanent magnets to form magnetic poles, the magnetic poles formed by the permanent magnets in adjacent installation recesses 12 are opposite, and the magnetic poles are arranged on the rotor core 10, the slit is positioned on the side of the installation recess 12 away from the rotation axis of the rotor 1, and in a cross-section perpendicular to the rotation axis of the rotor 1, the connecting line of the slit close to the installation recess 12 and the midpoint of the two ends remote from the installation recess 12 forms a direction line of the slit, wherein the central line of any magnetic pole passing through the axis of the rotor core 10 is set to be axis d. The slits on the side of the axis d, any installation recess 12 away from the rotation axis of the rotor 1, are symmetrically arranged along the axis d, so that the counter-electromotive force waveform of the motor is ensured to be approximately a sine wave, counter-electromotive force waveform distortion is reduced, additional loss is reduced, and the slits on the same side of the axis d comprise a first slit 14 and a second slit 16. The extension line of the direction line and the direction line of the second slit 16 intersect at one point and the intersection point is not on the axis d, so that the air gap magnetic density harmonic wave of the rotor 1 is weakened by optimizing the setting direction of the slit, the torque fluctuation amount of the motor is reduced, the vibration noise is improved, the counter potential of the rotor 1 is improved, the armature core loss is effectively reduced, and the medium-low frequency energy efficiency of the compressor is improved.

In a cross-section perpendicular to the rotation axis of the rotor 1, the extension lines of the two side walls of the tooth portion are configured to be suitable for separating the first slit 14 and the second slit 16 on the same side of the axis d, thereby effectively reducing armature iron loss, improving magnetic flux and further improving motor efficiency.

Figure 2:
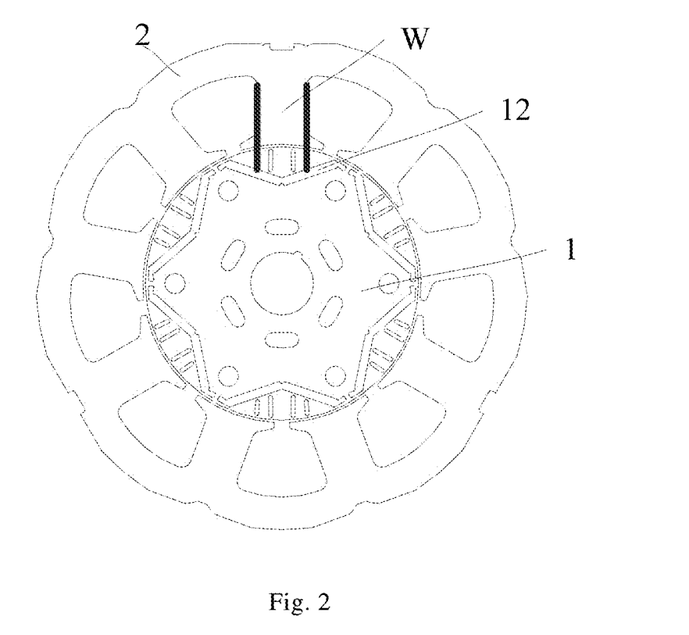
FIG. 2 is a schematic view showing the structure of a stator and a rotor according to one embodiment of the present disclosure.
Figure 3:
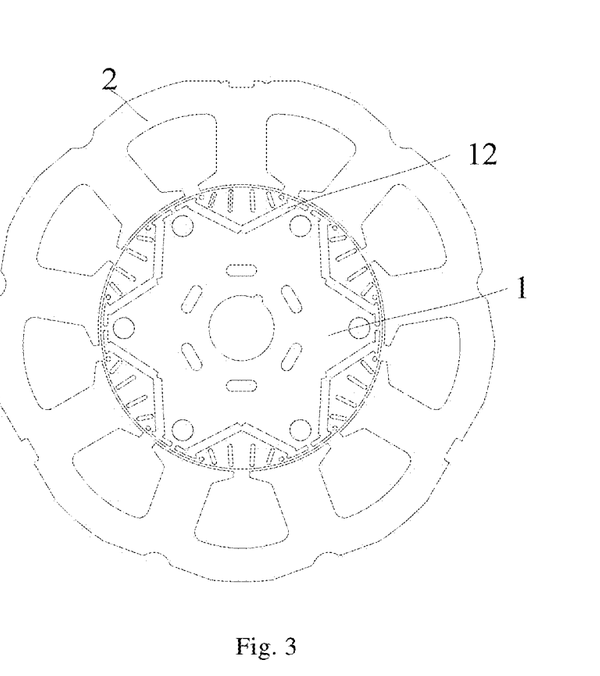
FIG. 3 is a schematic view showing the structure of a stator and a rotor according to another embodiment of the present disclosure.
Figure 4:
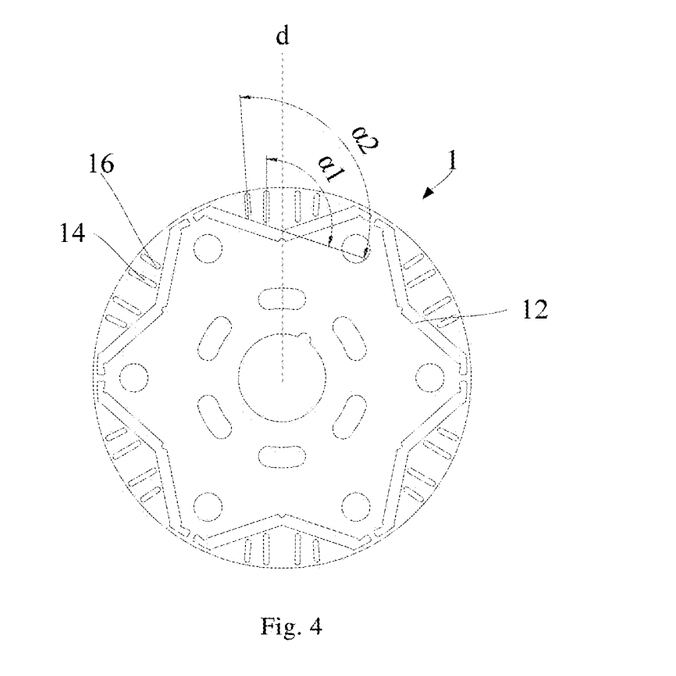
FIG. 4 is a schematic view of a partial size of a rotor according to one embodiment of the present disclosure.

Further, as shown in FIGS. 2 and 3, on one side of any installation recess 12 away from the rotation axis of the rotor 1, a region constituted by the extension lines of the two side walls of the tooth portion is configured to be suitable for having two complete slits. The region W constituted by extension lines of the two side walls of the tooth portion of the stator 2 is configured therein to be suitable for having two complete slits, namely a single magnetic pole has two slits with complete contours so that the air gap flux density harmonics of the motor is optimized, and the armature iron loss is effectively reduced.

As shown in FIGS. 1-4, on one side of any installation recess 12 away from the rotation axis of the rotor 1 and on the same side of the axis d, an included angle between the direction line of the first slit 14 and a side wall of the installation recess 12 facing the axis d direction is $\alpha 1$, and an included angle between the direction line of the second slit 16 and the side wall of the installation recess 12 facing the axis d direction is $\alpha 2$. The sum of $\alpha 1$ and $\alpha 2$ is greater than 180°, that is, any one of the included angles of $\alpha 1$ and $\alpha 2$ is an obtuse angle, which is favorable for improving air gap magnetic field waveform and effectively reducing armature iron loss.

However, the number of the slit affects the suppression effect on the armature magnetic field of the stator 2. Generally, the greater the number of the slits is, the better the suppression effect on the armature magnetic field of the stator 2 is. However, if the number is too large, the counter-electromotive force is reduced, and the manufacturing difficulty is increased. So the number of slits is set to be 4 or 6 so that the problems that the structural strength of the rotor core 10 is reduced, the magnetic flux is reduced, and the tooth space torque is increased because the number of slits is too large in the related art are avoided, and the problem that the radial force of the motor cannot be effectively improved because the number of slits is small is avoided. By arranging the number of the slits in a reasonable range, good noise reduction effect and counter-electromotive force effect of the motor can be effectively ensured under the condition of ensuring the reliability and convenience of processing of the rotor core 10 so that the cost performance of the motor is improved.

In the embodiment, the first slit 14 is arranged close to the axis d, and the second slit 16 is arranged away from the axis d. By defining that the ratio of $\alpha 2$ to $\alpha 1$ is greater than 1 and less than or equal to 1.1, an acute angle is formed between the extension lines of the direction lines of the first slit 14 and the second slit 16 which intersect at an intersection point not on the axis d, so that the air gap flux density harmonics of the rotor 1 are reduced, fluctuation of torque of a motor is reduced, and vibration noise is improved.

For example, defining the setting angle of the slit within a reasonable range can improve the air gap magnetic field waveform, effectively reduce the armature iron loss, increase the counter-electromotive force, and improve the low frequency energy efficiency of the compressor. For example, $\alpha 1$ is greater than 90° and less than or equal to 120°, $\alpha 2$ is greater than 90° and less than or equal to 130°.

Figure 11:
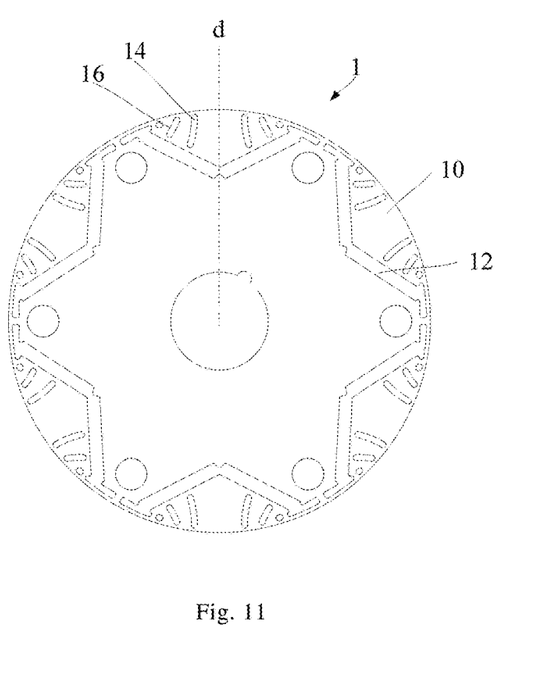
FIG. 11 is a schematic view showing another structure of a rotor according to one embodiment of the present disclosure.

For example, as shown in FIGS. 1 and 11, the rotor core 10 is on the cross-section perpendicular to the rotation axis of the rotor 1, the slit has a contour including a straight line and/or a curved line. Alternatively or additionally, multiple slits are symmetrically arranged relative to the axis d to rationalize the layout. In addition, multiple slits are symmetrically arranged relative to the axis d. As a result, the counter-electromotive force waveform of the motor is ensured to be approximate to a sine wave, the counter-electromotive force waveform distortion is reduced, and the addition of additional loss is reduced.

For example, the magnetic properties, sizes, and materials of the first permanent magnet and the second permanent magnet are the same.

Embodiment 2

Figure 5:
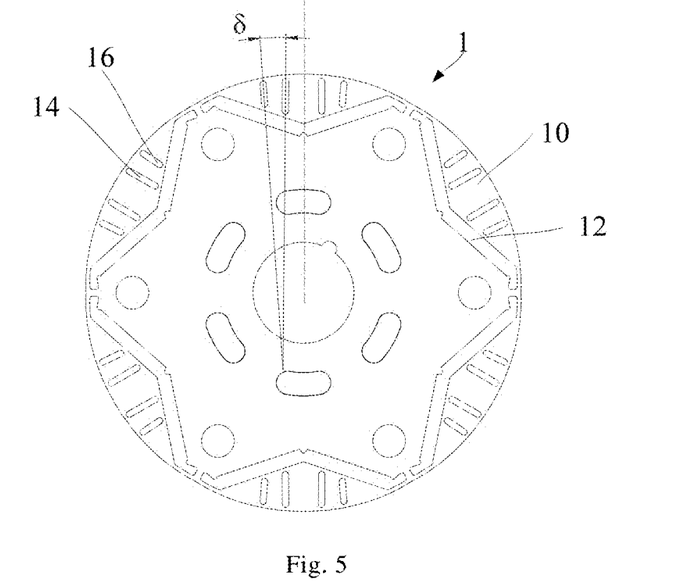
FIG. 5 is a schematic view of a partial angle of a rotor according to one embodiment of the present disclosure.
Figure 6:
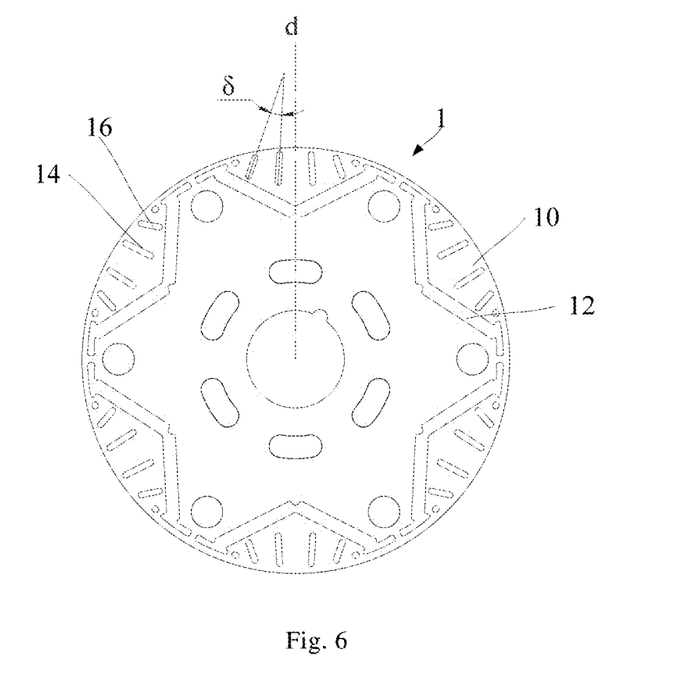
FIG. 6 is a schematic view of another partial angle of a rotor according to one embodiment of the present disclosure.

As shown in FIGS. 5 and 6, according to one embodiment of the present disclosure, in addition to the features defined in the above embodiment, on one side of any installation recess 12 away from the rotation axis of the rotor 1, and on the same side of the axis d, the included angle between the direction line of the first slit 14 and the direction line of the second slit 16 is greater than or equal to 3° and less than or equal to 20°.

In the embodiment, the extension lines of the direction lines of the first slit 14 and the second slit 16 form an acute angle $\delta$. For example, $3° \leq \delta \leq 20°$, so that the overall shape of the magnetic flux is changed, the output power of the motor is effectively increased, and when the motor is applied to a compressor, low noise or high efficiency of the compressor is achieved.

Embodiment 3

Figure 8:
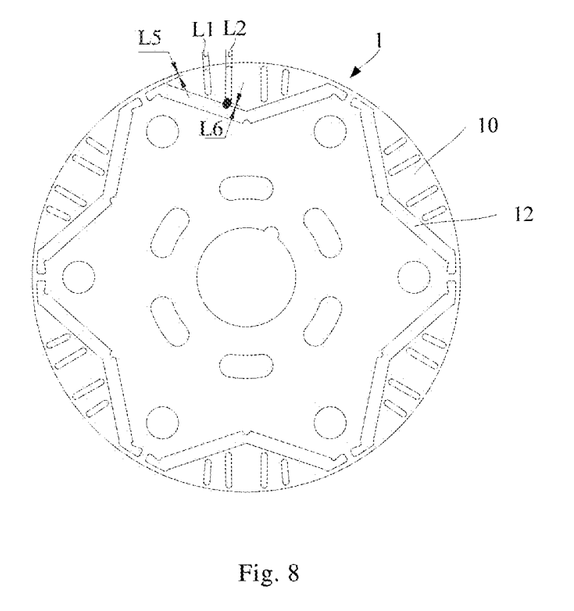
FIG. 8 is a schematic view of a further partial size of a rotor according to one embodiment of the present disclosure.

As shown in FIG. 8, according to one embodiment of the present disclosure, in addition to the features defined in the above embodiments, the width of the first slit 14 is L1 in a direction perpendicular to the direction line of the first slit 14; in a direction perpendicular to the direction line of the second slit 16, the width of the second slit 16 is L2, and L1 is not equal to L2; and/or the width of any one of the slits is different along the direction line of the slit.

In the embodiment, considering that the penetration depths of the armature magnetic field on the surface of the rotor 1 are different, the width of the first slit 14 and the width of the second slit 16 in the circumferential direction are set to be different so that the variation of the width of the slit is realized, and the weakening of the armature magnetic field is facilitated.

Embodiment 4

As shown in FIG. 1, according to one embodiment of the present disclosure, in addition to the features defined in the above embodiments, the permanent magnet includes a first permanent magnet and a second permanent magnet, the installation recess 12 includes two sub-installation recesses, the two sub-installation recesses are arranged along the circumferential direction of the rotor core 10, and the first permanent magnet and the second permanent magnet are respectively arranged in the two sub-installation recesses to form magnetic poles, wherein there is a first included angle between the two sub-installation recesses in either installation recess 12.

In the embodiment, the permanent magnet includes a first permanent magnet and a second permanent magnet, the magnetic field strengths of the first permanent magnet and the second permanent magnet can be the same or different, and the first permanent magnet and the second permanent magnet are respectively arranged in two different sub-installation recesses. In any installation recess 12, a first included angle is formed between two sub-installation recesses, that is, the first permanent magnet and the second permanent magnet are not parallel so that the waveform of the synthesized air gap magnetic field can be improved, the vibration noise of the motor is reduced, and the medium-low frequency energy efficiency of the compressor is improved.

For example, the permanent magnet is in a V-shaped structure, and the magnetism gathering effect generated by the V-shaped magnetic pole formed by the V-shaped permanent magnet is beneficial to improving the counter-electromotive force of the motor and further improving the low frequency energy efficiency of the compression. It is within the scope of the disclosure that the permanent magnet may also be of other shapes that meet the requirements, such as a U-shaped structure.

For example, the installation recess 12 is of a V-shaped structure so that when the outer diameter of the rotor 1 is reduced, the permanent magnet excitation of the rotor 1 side is ensured not to be reduced. Namely, the maintenance of the magnetic load of the motor is ensured while the line load of the motor is increased, so that the power density of the motor is increased, and the material utilization rate is improved.

For example, any one of the installation recesses 12 is symmetrically arranged with the axis d as a symmetry line.

For example, the included angle between the first permanent magnet and the second permanent magnet is set to be between 110° and 150° so that the counter-electromotive force of the permanent magnet can be maximized, the low frequency energy efficiency of the compressor is further ensured, and the APF (Annual Performance Factor) is improved.

Embodiment 5

Figure 7:
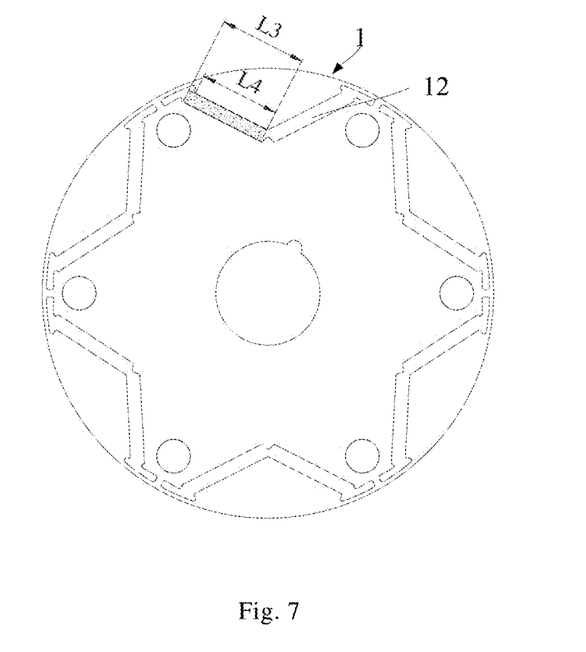
FIG. 7 is a schematic view of a further partial size of a rotor according to one embodiment of the present disclosure.

As shown in FIG. 7, according to one embodiment of the present disclosure, in addition to the features defined in any one of the above embodiments, the sub-installation recess includes the main groove portion and a gap portion communicated with the main groove portion, the gap portion is arranged at one end of the main groove portion close to the peripheral wall of the rotor core 10, the length of the first permanent magnet from one end close to the second permanent magnet to one end away from the second permanent magnet is L3, and a length of the main groove portion along the length direction of the first permanent magnet is L4, wherein L3 is greater than L4.

In the embodiment, the main groove portion is connected with the gap portion. The gap portion is used for magnetic isolation and defines that the length L3 of the first permanent magnet from one end close to the second permanent magnet to one end away from the second permanent magnet is greater than the length L4 of the main groove portion along the length direction of the first permanent magnet. For example, the ratio of (L3−L4)/L3 is between 0 and 0.5, therefore, the energy efficiency of the compressor can be improved, and the noise condition can be reduced.

Embodiment 6

As shown in FIG. 8, according to one embodiment of the present disclosure, in addition to the features defined in any one of the above embodiments, the minimum value of the distance between a wall face of the gap portion and the peripheral wall of the rotor core 10 is greater than the minimum value of the distance between a wall face of the slit and a wall face of the installation recess 12.

In the embodiment, the minimum value of the distance L5 between the wall face of the gap portion and the peripheral wall of the rotor core 10 is greater than the minimum value of the distance L6 between the wall face of the slit and the wall face of the installation recess 12 so that the magnetic flux guiding effect of the slit is improved, and the excitation present disclosure of the rotor 1 permanent magnet is ensured while the air gap flux density harmonics of the rotor 1 are reduced.

Figure 9:
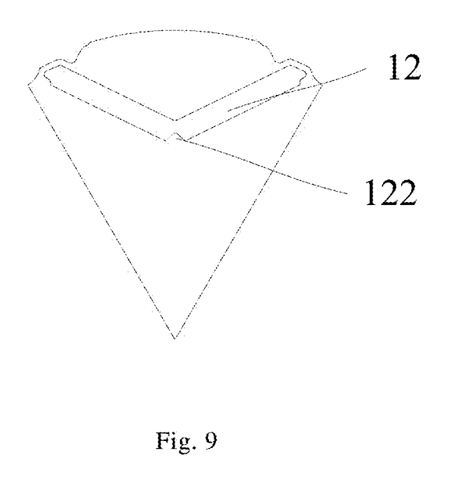
FIG. 9 is a schematic view showing a partial structure of a rotor according to one embodiment of the present disclosure.

For example, as shown in FIG. 9, in any one of the installation recesses 12, the two sub-installation recesses are communicated to each other, and the connection point of the two sub-installation recesses is provided with a detent convex point 122 which protrudes into the installation recess 12, and the position of the permanent magnet is defined by the detent convex point 122 so that the load flux density of the motor is improved, the air gap flux density waveform of the motor is optimized, the radial force of the motor is improved, and the noise of the motor is reduced.

Figure 10:
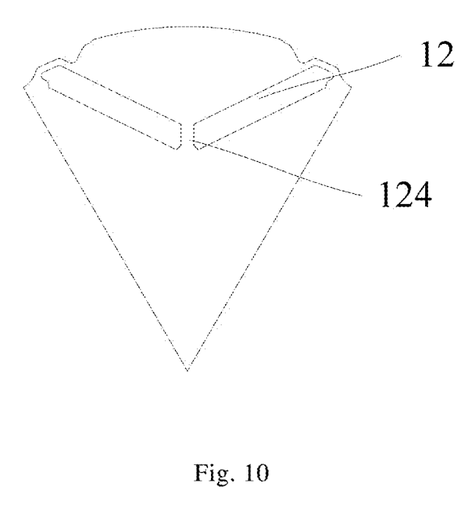
FIG. 10 is a schematic view showing another partial structure of a rotor according to one embodiment of the present disclosure.

For example, as shown in FIG. 10, in any installation recess 12, the two sub-installation recesses are connected by a connecting rib 124.

For example, the peripheral wall of the rotor core 10 is cylindrical. Alternatively or additionally, the rotor core 10 includes: multiple punching sheets stacked along the rotation axis direction of the rotor 1, wherein a riveting and fastening portion is arranged between adjacent installation recesses 12, and the multiple punching sheets are connected through the riveting and fastening portions to ensure the reliability of the rotor core 10.

Embodiment 7

As shown in FIGS. 1 and 2, according to one specific embodiment of the present disclosure, the present disclosure proposes a rotor 1. Multiple installation recesses 12 are arranged on a rotor core 10 along the axial direction of a rotating shaft, and the multiple installation recesses 12 are distributed along the circumferential direction of the rotor 1. At least one pair of permanent magnets are respectively inserted into the installation recesses 12 to form a magnetic pole of the rotor 1, the pair of permanent magnets are respectively positioned on two sides of a d shaft of the rotor 1, and in any plane perpendicular to a rotating shaft of the motor, extension lines of long sides of the pair of permanent magnets do not coincide and intersect at one point. A fastening hole penetrating through the rotor core 10 in the axial direction is arranged on the radially inner side of the magnetic pole portion of the rotor 1 (the rotor 1 punching sheets can be connected into a whole). The connecting line between the center of one of the multiple installation recesses 12 and the center of the rotor 1 is defined as an axis d with the central axis of the rotor 1 as the center of rotation, and multiple slits are positioned between the corresponding installation recess 12 and the peripheral wall of the rotor core 10. The slit includes a first slit 14 and a second slit 16, and the contour line of the slit is formed by enclosing multiple curves and/or straight lines end to end. On a cross-section of the radially outboard magnetic pole portion perpendicular to the rotation central axis, the connection between the midpoint of the short side or arc of each first slit 14 and the midpoint of the short side at the other end constitutes the direction line of the slit. The first slit 14 and the second slit 16 are separated by two extension lines radially inward of the two side walls of the stator tooth width, and in a region W constituted by the two extension lines, a single magnetic pole has only two slits with a complete contour. The extension lines of the direction lines of the first slit 14 and the second slit 16 have an intersection point, and the intersection point is not on the axis d. The sum of the angles toward one side of the axis d of the direction lines of the first slit 14 and the second slit 16, and the contour line of the installation recess 12 which intersects with the direction lines and is the closest thereto is greater than 180°.

Embodiment 8

According to a second aspect of the present disclosure, there is also provided a motor, including the rotor 1 of any one of the above embodiments.

The motor provided in the second aspect of the present disclosure has all the beneficial effects of the rotor 1 because it includes the rotor 1 according to any one of the above embodiments.

Figure 12:
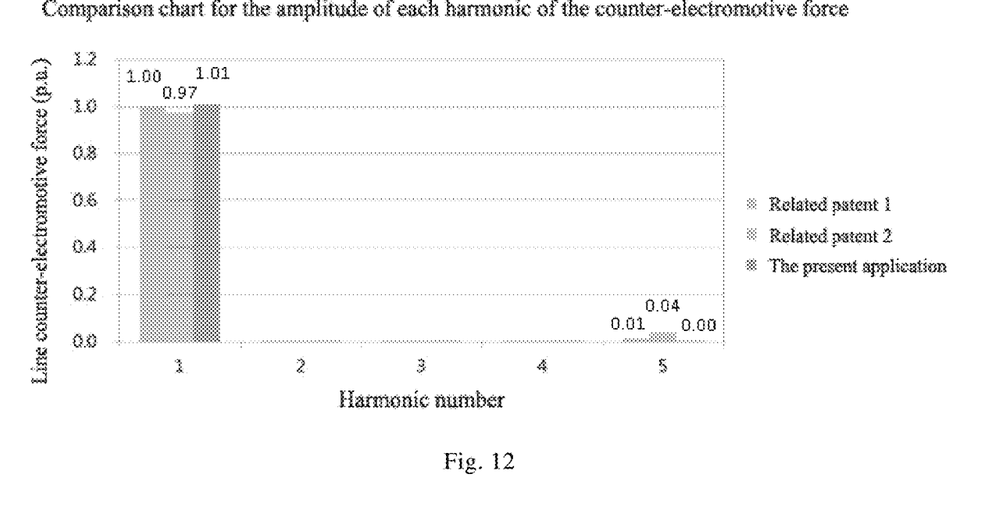
FIG. 12 is a chart comparing the magnitude of each harmonic of the counter-electromotive force of a motor of one embodiment of the present disclosure with that of the motor of the related art.

For example, FIG. 12 shows a chart comparing the magnitude of each harmonic of the counter-electromotive force of one embodiment of the present disclosure with that of the related art. It can be seen that the counter-electromotive force of the motor of the present disclosure is improved over the related art.

Figure 13:
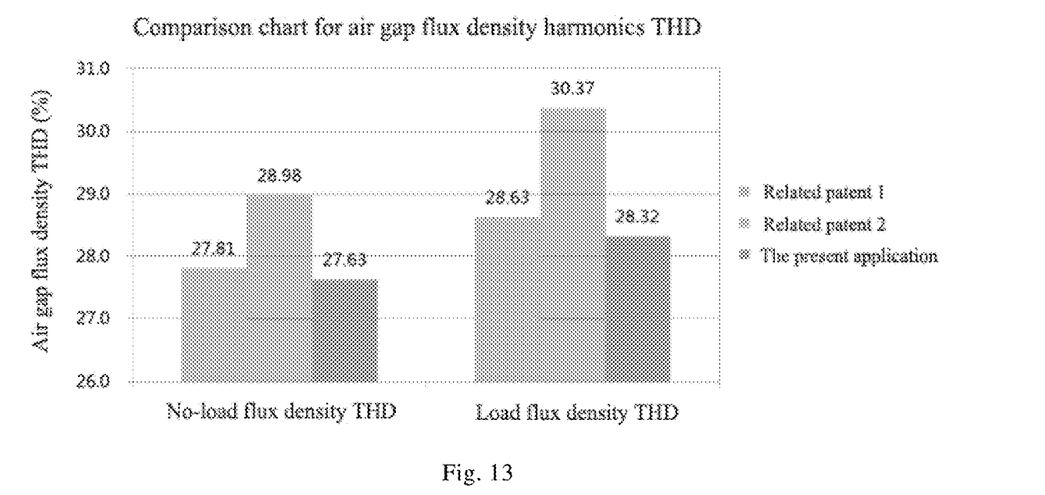
FIG. 13 is a chart comparing the air gap flux density harmonic distortion of a motor of one embodiment of the present disclosure with that of the motor of the related art.

For example, as shown in FIG. 13, a chart comparing the air gap flux density harmonics THD (harmonic distortion) of a motor of one embodiment of the present disclosure with that of the related art, the no-load flux density THD, and the load flux density THD of the permanent magnet motor provided by the present disclosure are smaller than those of the permanent magnet motor in the related art, so it can be seen that the improvement effect of the rotor 1 of the present disclosure on the air gap magnetic field waveform is obvious.

Figure 14:
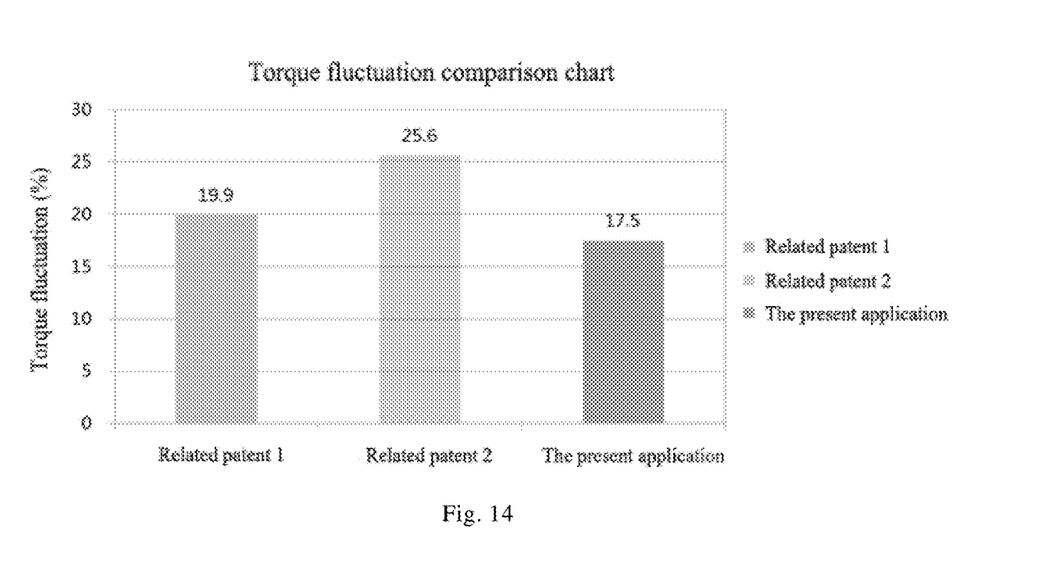
FIG. 14 is a chart comparing torque fluctuation of a motor of one embodiment of the present disclosure with that of the motor of the related art.

For example, as shown in FIG. 14, a chart comparing torque fluctuation of a motor of one embodiment of the present disclosure with that of the related art, the torque fluctuation of the permanent magnet motor provided by the present disclosure is smaller than that of the related art, so it can be seen that the rotor 1 of the present disclosure can effectively improve noise hearing.

For example, the motor further includes: a stator 2, including a stator core (not shown in the figure), wherein the stator core is enclosed outside the rotor 1; multiple tooth portions arranged on one side, facing the rotor core 10, of the stator core, wherein the multiple tooth portions are arranged along the circumferential direction of the stator core, and a stator 2 recess gap is defined between adjacent tooth portions; a coil wound around the tooth portion, wherein the number of the stator 2 recess gap is Z, the number of pole pairs of the rotor 1 is P, and the ratio of Z to 2P is equal to 3/2 or 6/5 or 6/7.

In the embodiment, the stator 2 includes a stator core and tooth portion, a stator 2 recess gap is defined between adjacent tooth portions, a coil is wound around the tooth portion, and the stator core is enclosed outside the rotor 1. The proportional relation between the number Z of the stator 2 recess gap and the number of pole pairs P of the rotor 1 is defined, thereby defining a pole and recess fit of the motor. When the number of pole pairs of the rotor 1 is P, the pole number of the rotor 1 is 2P, namely, the motor can be a 6-pole 9-recess motor, a 4-pole 6-recess motor, an 8-pole 12-recess motor, and a 10-pole 12-recess motor. The above types of motors can effectively reduce armature iron loss, improve magnetic flux and further improve motor efficiency.

For example, the inner diameter of the stator core is Di, the rated torque of the motor is T, the unit volume torque of the rotor is TPV, and the following relational expression is satisfied: $5.18 \times 10^{-7} \leq T \times Di^{-3} \times TPV^{-1} \leq 1.17 \times 10^{-6}$, $5 \text{ kN·m·m}^{-3} \leq TPV \leq 45 \text{ kN·m·m}^3$, wherein the unit of the rated torque T of the motor is N·m, the unit of the inner diameter Di of the stator core is mm, and the unit of the unit volume torque TPV of the rotor is kN·m·m$^3$.

In the embodiment, the rated torque of the motor is T, the inner diameter of the stator core is Di, the unit volume torque of the rotor 1 is TPV, and $5.18 \times 10^{-7} \leq T \times Di^{-3} \times TPV^{-1} \leq 1.17 \times 10^{-6}$ is satisfied. The value range of the unit volume torque TPV is $5 \text{ kN·m·m}^{-3} \leq TPV \leq 45 \text{ kN·m·m}^{-3}$. The value range of the combined variable of the rated torque T of the motor, the inner diameter Di of the stator core, and the unit volume torque TPV of the rotor 1 is defined so that the motor can meet the power requirement of the compressor 100. In addition, for the motor and the compressor 100 adopting the rotor 1, the magnetic leakage of the rotor 1 can be effectively reduced, the utilization rate of the permanent magnet is increased, and the motor efficiency is improved.

For example, one side of multiple tooth portions facing the rotor core 10 encloses to form the inner side wall of the stator 2, and the ratio of the diameter of the inner side wall of the stator 2 to the diameter of the outer side wall of the stator core is greater than 0.5 and less than or equal to 0.58.

In the embodiment, the ratio of the diameter of the inner side wall of the stator 2 to the diameter of the outer side wall of the stator core is greater than 0.5 and less than or equal to 0.57 so that the motor has a high cost performance.

Embodiment 9

Figure 15:
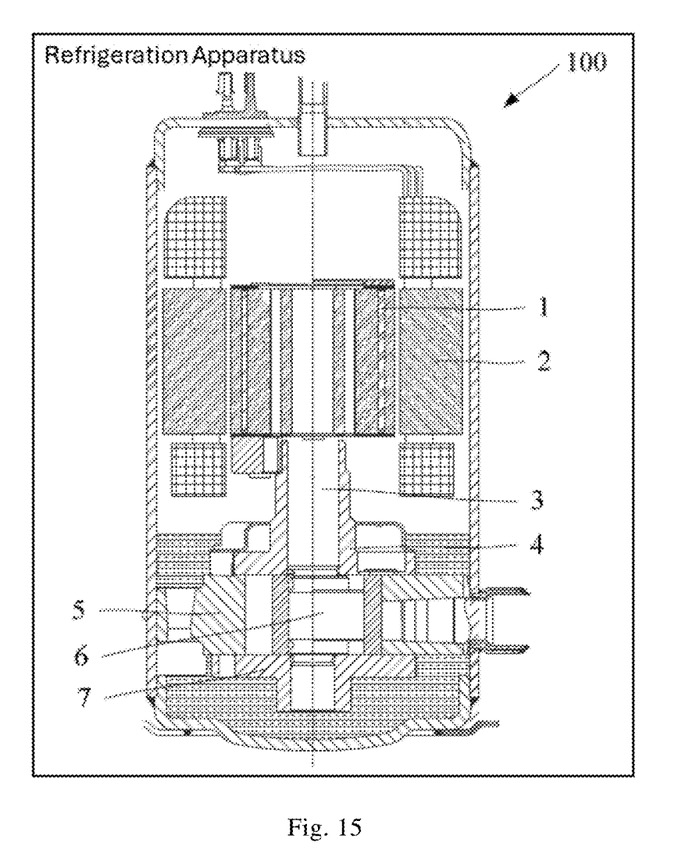
FIG. 15 is a schematic view showing the structure of a compressor according to one embodiment of the present disclosure.

As shown in FIG. 15, according to a third aspect of the present disclosure, there is also provided a compressor 100 including the rotor 1 as set forth in any one of the embodiments of the first aspect; or the motor as set forth in any one of the embodiments of the second aspect.

The compressor 100 provided in the third aspect of the present disclosure includes the rotor 1 as set forth in any one of the embodiments of the first aspect; or the motor as set forth in any one of the embodiments of the second aspect, thereby having all the beneficial effects of the rotor 1 or the motor.

For example, the compressor 100 further includes a crankshaft 3 penetrating through the rotor core 10 of the rotor 1 and connected with the rotor core 10; and a power portion connected with a shaft and configured to drive the shaft to rotate.

In the embodiment, the compressor 100 further includes a crankshaft 3 and a power portion, wherein the crankshaft 3 penetrates through the rotor core 10 of the rotor 1, and the crankshaft 3 connects the rotor core 10 with the power portion to drive the crankshaft 3 to rotate and further drive the rotor core 10 to rotate when the power portion works. For example, the crankshaft 3 of the compressor 100 is connected to the rotor core 10 through a shaft hole of the rotor core 10.

For example, the compressor 100 further includes a main bearing 4, an auxiliary bearing 7, a cylinder 5, and a piston 6. One end of the crankshaft 3 penetrates through the rotor 1, and the other end of the crankshaft 3 sequentially penetrates through the main bearing 4, the cylinder 5, and the auxiliary bearing 7.

Embodiment 10

According to a fourth aspect of the present disclosure, there is also provided a refrigeration apparatus (not shown in the figure), including: the rotor 1 as set forth in any one of the embodiments of the first aspect; or the motor as set forth in any one of the embodiments of the second aspect; or the compressor 100 as set forth in any one of the embodiments of the third aspect.

The refrigeration apparatus provided by the fourth aspect of the present disclosure includes the rotor 1 according to any one of the embodiments of the first aspect; or the motor as set forth in any one of the embodiments of the second aspect; or the compressor 100 as set forth in any one of the embodiments of the third aspect, thereby having all the beneficial effects of the rotor 1 or the motor or the compressor 100.

In the present disclosure, the term "multiple" refers to two or more, unless explicitly defined otherwise. The terms "install", "connected", "connect", "fixed", etc. should be understood in a broad sense. For example, "connect" can be a fixed connection, a detachable connection, or an integral connection; "connected" can be directly connected, or indirectly connected through an intermediary. The specific meaning of the above terms in the present disclosure will be understood by those of ordinary skills in the art, as the case may be.

In the illustration of the description, the illustration of the terms of "one embodiment", "some embodiments", "specific embodiment", etc. means that the specific features, structures, materials, or characteristics described in conjunction with the embodiments or examples are included in at least one embodiment or example of the present disclosure. In this description, schematic representations of the above terms do not necessarily refer to the same embodiment or example. Moreover, the specific features, structures, materials, or characteristics described may be combined in any suitable manner in any one or more embodiments or examples.

The foregoing is only a preferred embodiment of the present disclosure and is not intended to limit the present disclosure. For those skilled in the art, the present disclosure can have various modifications and changes. Any modifications, equivalents, improvements, etc. that come within the spirit and principle of the present disclosure are intended to be included within the scope of the present disclosure.

What is claimed is:

1. A rotor for a motor, comprising:
    a rotor core comprising a plurality of installation recesses, wherein the installation recesses are distributed along a circumferential direction of the rotor core;
    a plurality of permanent magnets arranged in the installation recesses to form a plurality of magnetic pole, wherein the plurality of permanent magnets comprise a first permanent magnet and a second permanent magnet, and an extension line of a side wall of the first permanent magnet away from a rotation axis of the rotor and an extension line of a side wall of the second permanent magnet away from the rotation axis of the rotor intersect at a point and do not coincide with each other; and
    a plurality of slits arranged on the rotor core and positioned on a side of one of the plurality of installation recesses away from the rotation axis of the rotor, a connection line between central points of two end portions of each slit close to and away from the installation recess forming a direction line of the slit within a cross-section perpendicular to the rotation axis of the rotor,
    wherein a central line of any one of the plurality of magnetic poles passing through a central axis of the rotor core is defined as an axis d, and
    wherein the plurality of slits comprises a first slit and a second slit positioned on a same side of the axis d, and an extension line of the direction line of the first slit and an extension line of the direction line of the second slit intersect at an intersection point that is not on the axis d and on the same side of the axis d as the first slit and the second slit.

2. The rotor of claim 1, wherein:
    on one side of any one of the installation recesses away from the rotation axis of the rotor, and on the same side of the axis d, an included angle between the direction line of the first slit and a side wall of the installation recess towards the axis d direction is α1, and an included angle between the direction line of the second slit and the side wall of the installation recess towards the axis d direction is α2, and
    a sum of the α1 and the α2 is greater than 180°.

3. The rotor of claim 2, wherein:
    in a cross-section perpendicular to the rotation axis of the rotor, extension lines of two side walls of a tooth portion of the stator are configured to be suitable for separating the first slit and the second slit which are positioned on the same side of the axis d, and
    on one side of any one of the installation recesses away from the rotation axis of the rotor, a region constituted by the extension lines of the two side walls of the tooth portion of the stator is configured to be suitable for having two complete slits.

4. The rotor of claim 1, wherein on one side of any one of the installation recesses away from the rotation axis of the rotor, and on the same side of the axis d, the included angle between the direction line of the first slit and the direction line of the second slit is greater than or equal to 3° and less than or equal to 20°.

5. The rotor of claim 1, wherein:
    each installation recess comprises a main groove portion and a gap portion communicated with the main groove portion, the gap portion being arranged at one end of the main groove portion close to a peripheral wall of the rotor core, a length of the first permanent magnet from one end close to the second permanent magnet to one end away from the second permanent magnet is L3, and a length of the main groove portion along a length direction of the first permanent magnet is L4, and the L3 is greater than the L4.

6. The rotor of claim 5, wherein a minimum value of a distance between a wall face of the gap portion and the peripheral wall of the rotor core is greater than the minimum value of the distance between a wall face of the slit and a wall face of the installation recess.

7. The rotor of claim 6, wherein:

on one side of any one of the installation recesses away from the rotation axis of the rotor, and on the same side of the axis d, an included angle between the direction line of the first slit and a side wall of the installation recess towards the axis d direction is α1, and an included angle between the direction line of the second slit and the side wall of the installation recess towards the axis d direction is α2; and a ratio of the α2 to the α1 is greater than 1 and less than or equal to 1.1.

8. The rotor of claim 7, wherein:

the α1 is greater than 90° and less than or equal to 120°; and/or the α2 is greater than 90° and less than or equal to 130°.

9. The rotor of claim 1, wherein:

along a direction perpendicular to the direction line of the first slit, a width of the first slit is L1, along the direction perpendicular to the direction line of the second slit, the width of the second slit is L2, and L1 is not equal to L2; and/or along the direction of the direction line of the slit, a width of any one of the slits is different.

10. The rotor of claim 1, wherein:

each installation recess comprises two sub-installation recesses, the two sub-installation recesses are arranged along the circumferential direction of the rotor core, and the first permanent magnet and the second permanent magnet are respectively arranged in the two sub-installation recesses to form the magnetic poles, and a first included angle is formed between the two sub-installation recesses in any one of the installation recesses.

11. The rotor of claim 10, wherein the first included angle is greater than or equal to 110° and less than or equal to 150°.

12. The rotor of claim 11, wherein in any one of the installation recesses, the two sub-installation recesses are communicated to each other, and a connection point of the two sub-installation recesses is provided with a detent convex point that protrudes into the installation recess.

13. The rotor of claim 11, wherein in any one of the installation recesses, two sub-installation recesses are connected through a connecting rib.

14. The rotor of claim 1, wherein:

the rotor core is on a cross-section perpendicular to the rotation axis of the rotor, and each slit has a contour including a straight line and/or a curved line; and/or the plurality of slits are arranged symmetrically with respect to the axis d.

15. The rotor of claim 1, wherein:

the peripheral wall of the rotor core is cylindrical; and/or the rotor core comprises: multiple punching sheets, being stacked along a rotation axis direction of the rotor, a riveting and fastening portion being arranged between adjacent installation recesses, and the multiple punching sheets being connected through the riveting and fastening portions.

16. A motor comprising:

the rotor of claim 1;

a stator comprising a stator core, wherein the stator core is enclosed outside the rotor;

multiple tooth portions, being arranged on one side of the stator core, wherein said one side of the stator core faces the rotor core, wherein the multiple tooth portions are arranged along the circumferential direction of the stator core, and a stator recess gap is defined between adjacent tooth portions; and a coil wound around the tooth portion, wherein the number of the stator recess gaps is Z, the number of pole pairs of the rotor is P, and the ratio of the Z to the 2P is equal to 3/2 or 6/5 or 6/7.

17. The motor of claim 16, wherein:

an inner diameter of the stator core is Di, a rated torque of the motor is T, a unit volume torque of the rotor is TPV, and a following relational expression is satisfied: $5.18 \times 10^{-7} \leq T \times Di^{-3} \times TPV^{-1} \leq 1.17 \times 10^{-6}$, $5 \text{ kN·m·m}^{-3} \leq TPV \leq 45 \text{ kN·m·m}^{-3}$, and a unit of the rated torque T of the motor is N·m, the unit of the inner diameter Di of the stator core is mm, and the unit of the unit volume torque TPV of the rotor is kN·m·m$^{-3}$.

18. The motor of claim 17, wherein:

one side of multiple tooth portions facing the rotor core is enclosed to form an inner side wall of the stator, and a ratio of a diameter of the inner side wall of the stator to the diameter of the outer side wall of the stator core is greater than 0.5 and smaller than or equal to 0.57.

19. A compressor comprising the motor of claim 16.

20. A refrigeration apparatus comprising the compressor of claim 19.

* * * * *